United States Patent [19]

Charm

[11] 4,417,714

[45] Nov. 29, 1983

[54] HANGING DEVICE MOUNTING SYSTEM FOR DEVICES SUCH AS SPEAKER ENCLOSURES

[76] Inventor: Orrin Charm, 725 Lorraine Blvd., Los Angeles, Calif. 90005

[21] Appl. No.: 278,597

[22] Filed: Jun. 29, 1981

[51] Int. Cl.³ .............................................. B61L 11/02
[52] U.S. Cl. ..................................... 248/323; 248/328
[58] Field of Search ............... 248/317, 318, 323, 327, 248/324, 326, 328, 333; 211/113, 117; 179/146 E; 294/74

[56] References Cited

U.S. PATENT DOCUMENTS

| | | | |
|---|---|---|---|
| 543,150 | 7/1895 | Gill | 248/318 X |
| 831,996 | 9/1906 | Rydquist | 248/327 |
| 3,120,403 | 2/1964 | Molzan et al. | 294/74 |
| 4,101,109 | 7/1978 | Edwards | 248/317 |
| 4,227,669 | 10/1980 | McInnis | 248/317 |

FOREIGN PATENT DOCUMENTS

| | | | |
|---|---|---|---|
| 522762 | 9/1953 | Belgium | 248/317 |
| 1320218 | 1/1963 | France | 294/74 |
| 500523 | 2/1939 | United Kingdom | 248/343 |

*Primary Examiner*—J. Franklin Foss
*Attorney, Agent, or Firm*—Fraser and Bogucki

[57] ABSTRACT

A stable and highly directable hanging device mounting system for devices such as speaker enclosures provides 360° of rotation in conjunction with an attitude that is adjustable through 120° or more. The mounting system includes a support plate having three support plate receptacles disposed thereon in a non-collinear relationship, three device receptacles adapted to be secured to a device being mounted and distributed about the center of gravity thereof, and a cord threaded alternately through the support plate receptacles and device receptacles to form a plurality of loops supporting the device receptacles and hence the device in a stable hanging relationship relative to the support plate. The sliding relationship of the cord loops relative to the receptacles permits the attitude of the supported device to be readily adjusted while rotation of the support plate permits rotation of the device to a desired angular position.

5 Claims, 5 Drawing Figures

U.S. Patent  Nov. 29, 1983  Sheet 1 of 2  4,417,714

HANGING DEVICE MOUNTING SYSTEM FOR DEVICES SUCH AS SPEAKER ENCLOSURES

BACKGROUND OF THE INVENTION

1. Field of the Invention

This invention relates to a stable and highly directable hanging device mounting system for devices such as speaker enclosures.

2. Discussion of the Prior Art

It is often desirable to mount a device such as a speaker or a microphone at an elevated room location in such a way that the device remains stable during operation but may be readily adjusted as to angle of rotation or elevational attitude either to accommodate changing conditions within the surrounding area or simply to enable precise and easy disposition in a desired position.

Such mounting arrangements have traditionally required bulky platforms and expensive, hard to adjust mounting mechanisms or alternatively hanging arrangements which do not afford a combination of easy installation, instant adjustability, and substantial stability.

SUMMARY OF THE INVENTION

A stable and highly directable hanging device mounting system in accordance with the invention comprises a support plate adapted to be rotatably secured to a supporting structure and having three support plate receptacles disposed thereon in a non-collinear relationship to slidably receive and support a loop of cord, three device mounting receptacles adapted to be secured to a device to be mounted at spaced apart locations thereon and to slidably receive a support loop of cord, and a flexible cord threaded alternately through the support plate receptacles and devices mounting receptacles to form multiple slidable loops for supporting a device in a stable hanging relationship to the support plate with an easily adjustable attitude.

Sliding of the cord through eyelets forming the support plate and device mounting receptacles permits the supporting cord loop lengths to be readily adjusted as the attitude of the mounted device is changed as desired with two degrees of rotational freedom while the mounted device remains at a selected position. Concurrently, the support plate may be rotated within its mounting to provide a desired degree of rotation of the mounted device with a third degree of rotational freedom. Once positioned, the three point support and frictional engagement of the mounting cord to the support plate receptacles provides a highly stable, non-swinging hanging mounting relationship. The support plate may be secured to a ceiling joist or other support structure by a convenient fastener such as a lag bolt.

BRIEF DESCRIPTION OF THE DRAWINGS

A better understanding of the invention may be had from a consideration of the following detailed description taken in conjunction with the accompanying drawings, in which.

DETAILED DESCRIPTION

Figure 1:
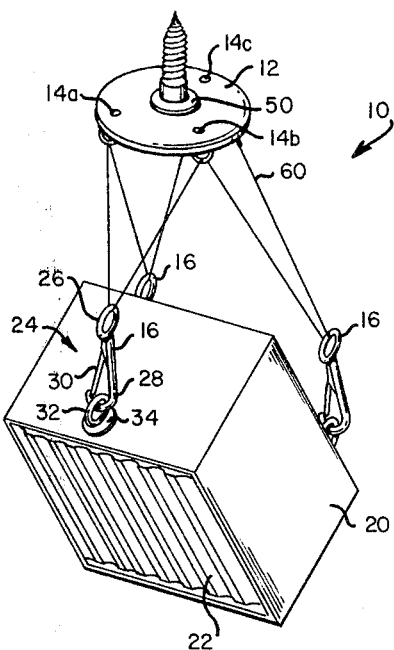
FIG. 1 is a frontal perspective view of a directable hanging device mounting system in accordance with the invention.
Figure 2:
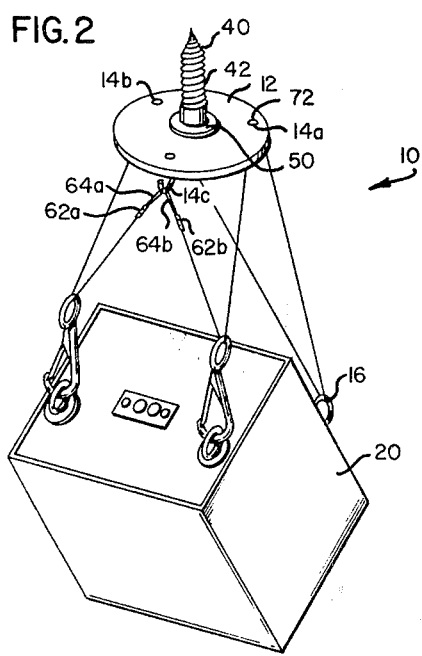
FIG. 2 is a perspective view of a hanging device mounting system in accordance with the invention taken from a rearward direction.
Figure 3:
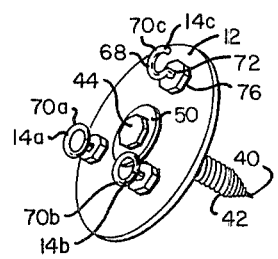
FIG. 3 is a perspective view of a support plate for the mounting system shown in FIGS. 1 and 2.
Figure 4:
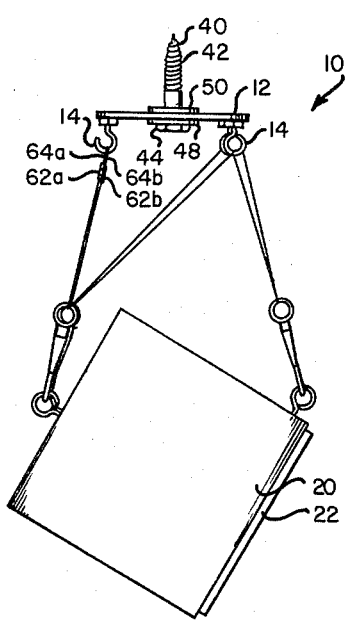
FIG. 4 is a side view of the hanging device mounting system shown in FIGS. 1 and 2.

Referring now to FIGS. 1-5, a stable and highly directable hanging device mounting system 10 in accordance with the invention includes a disk-shaped support plate 12 having three support plate cord holders or receptacles in the form of two screw eyelets 14a, 14b and a screw hook 14c disposed thereon. Three device cord holders or receptacles in the form of screw eyelets 16 are adapted to be secured to a device at three spaced-apart positions which are preferably distributed about the center of gravity of the device and are shown herein affixed to a speaker enclosure 20. The speaker enclosure 20 is in this example a rigid, rectangular wooden box which is enclosed on five sides with a front surface being covered by a permeable grill 22 through which sound waves from an internally mounted speaker may pass. Each of the device cord holders includes a snap hook 24 having a closed, circular eyelet 26 at one end thereof and a hook 28 closed by a compression spring 30 at an opposite end thereof. The hook is passed through a closed circular eyelet 32 of a screw eye having a threaded end (not shown) embedded in the speaker enclosure 20 and a small washer 34 disposed between the eyelet 32 and the surface of the speaker enclosure.

The support plate is preferably a steel of aluminum disk with a diameter of approximately 2.75" and a thickness of approximately $\frac{1}{8}$". Support plate 12 has a central aperture therein (not explicitly shown) receiving a lag bolt 40 having threads 42 at one end and a head 44 at the opposite end. A pair of washers 48, 50 is threaded by the lag bolt 40 and positioned on respectively opposite sides of the circular disk support plate 12 to permit rotation of support plate 12 about lag bolt 40 after lag bolt 40 has been secured to a ceiling joist or other suitable mounting support structure sufficiently snug to prevent unwanted rotation of support plate 12 but sufficiently loose to permit manual rotation of support plate 12.

Figure 5:
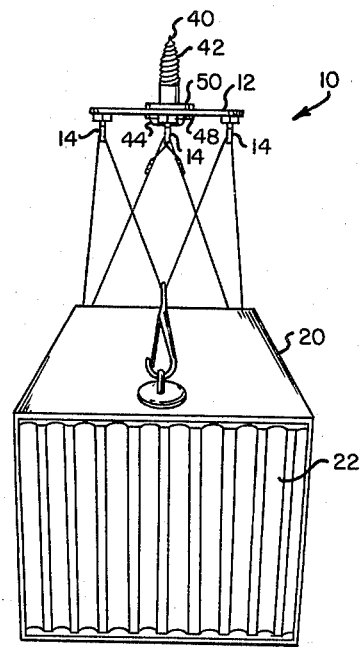
FIG. 5 is a front perspective view of the hanging device mounting system shown in FIGS. 1 and 2.

A cord 60 is slidingly threaded through alternately the support plate cord mounting receptacles 14a, 14b and the device cord mounting receptacles 16 to permit relative adjustment of loop lengths formed thereby to accommodate desired adjustments in the rotational attitude of the mounted device. Compression sleeves 62a and 62b may be utilized to form loops 64a, 64b respectively in the two ends of cord 60 to secure the two ends of the cord 60 to screw hook 14c. Alternatively, the ends of the cord could be secured together to form an endless loop passing alternately through the three plate receptacles 14 and the three device receptacles 26 as illustrated in FIG. 5.

In the preferred example the cord may be fabricated with a small loop 64 at each end, secured by a compression sleeve 62 as mentioned above. One eyelet in the device, either affixed to the speaker enclosure or the support plate, is configured in an open loop or hook, so that the end loops 64 in the cord may be hooked into the eyelet before and after the cord is threaded through the remaining eyelets. Alternatively, a ball-and-slot or other method may be used to attach the ends of the cord. With looped cord ends the snap hooks may be omitted where desirable and the cord and remaining hardware may be packaged separately with a cord length being chosen to suit a particular application.

The support plate mounting receptacles 14 may be advantageously implemented as screw eyes 68 each having a closed eyelet 70a, 70b or a hook 70c at one end for receiving the cord 60 and a machine screw 72 at the opposite end threadingly engaging internally threaded apertures 74 in the support plate 12. A lock nut 76 may be threadingly disposed upon the threaded end 72 of eye screw 68 to tightly engage support plate 12 and thereby frictionally lock each eye screw 68 in place. Receptacles 14 may alternatively be welded or otherwise secured to support plate 12, or an integral part of the plate.

The mounting enclosure 10 thus provides a versatile, yet highly stable three point mounting apparatus which permits a device such as a speaker enclosure to be mounted in a hanging, non-swinging three point relationship with a full 360° of rotation and 120° or more of attitude adjustment. Distribution of the device mounting receptacles about the center of gravity of the device improves the stability of the mounting while the exact locations may be variably selected so as to accommodate an anticipated preferred mounting attitude. For example, placement of one mounting bracket on the top surface near the front center with the other two brackets being placed on the left and right sides of the back surface about half way between the top and bottom provides a broad range of mounting attitudes from facing straight ahead, to facing straight down to facing upward at a relatively steep angle. Other placements of the mounting brackets 16 may be utilized to accommodate other ranges of adjustable attitudes.

While there has been shown and described above a particular arrangement of a hanging device mounting system for the purpose of enabling a person skilled in the art to make and use the invention, it will be appreciated that the invention is not limited thereto. Accordingly, any modifications, variations or equivalent arrangements within the scope of the attached claims should be considered to be within the scope of the invention.

What is claimed is:

1. A hanging device mounting system comprising:
    a support plate having three support plate cord holders disposed thereon in a non-collinear relationship;
    three device cord holders adapted to be secured to a device at three spaced-apart positions thereon distributed about the center of gravity of the device at locations selected to provide a stable hanging mounting for the device, the device cord holders each including a first mounting element that is securable to a device and a second mounting element removably coupled to the first mounting element, the second mounting element receiving the cord in a supporting relationship; and
    a cord connecting alternately the support plate cord holders and the device cord holders and being slidably coupled to at least all but one of the cord holder second mounting elements.
2. The hanging device mounting system according to claim 1 above, wherein the first mounting element is a screw eye.
3. The hanging device mounting system according to claim 1 or 2 above, wherein the second mounting element is a snap hook.
4. The hanging device mounting system according to claim 3 above, further comprising a fastener adapted to rotatably fasten the support plate to a desired mounting location.
5. The hanging device mounting system according to claim 4 above, wherein the support plate has a central aperture therethrough and the fastener comprises a lag bolt extending through the aperture and two washers disposed on opposite sides of the support plate and threaded by the lag bolt.

* * * * *

UNITED STATES PATENT AND TRADEMARK OFFICE
CERTIFICATE OF CORRECTION

PATENT NO. : 4,417,714
DATED : November 29, 1983
INVENTOR(S) : Orrin Charm

It is certified that error appears in the above—identified patent and that said Letters Patent are hereby corrected as shown below:

Column 1, line 36, after "and" and before "mounting", "devices" should read --device--. Column 2, line 30, after "steel" and before "aluminum", "of" should read --or--.

Signed and Sealed this

Twenty-seventh Day of March 1984

[SEAL]

Attest:

Attesting Officer

GERALD J. MOSSINGHOFF

Commissioner of Patents and Trademarks